(12) United States Patent
Lemoine

(10) Patent No.: US 6,223,476 B1
(45) Date of Patent: May 1, 2001

(54) RETRACTABLE CEILING ASSEMBLY

(76) Inventor: William C. Lemoine, 258 Tiger Bend Rd., Marion, LA (US) 71260

( * ) Notice: Subject to any disclaimer, the term of this patent is extended or adjusted under 35 U.S.C. 154(b) by 0 days.

(21) Appl. No.: 09/453,599

(22) Filed: Nov. 30, 1999

(51) Int. Cl.[7] ........................................... E04B 7/00
(52) U.S. Cl. ............................ 52/22; 52/66; 52/83; 52/64
(58) Field of Search ................................... 52/22, 66, 83, 52/64

(56) References Cited

U.S. PATENT DOCUMENTS

| | | | |
|---|---|---|---|
| 3,612,589 | * 10/1971 | Locher, Jr. | 296/23 |
| 4,006,567 | * 2/1977 | Flannery | 52/126 |
| 4,064,648 | * 12/1977 | Cary | 47/17 |
| 4,257,199 | * 3/1981 | Kuboyama | 52/2 |
| 4,598,506 | * 7/1986 | Nohl et al. | 52/66 |
| 4,706,420 | * 11/1987 | Winkler | 52/22 |
| 4,928,444 | 5/1990 | Horie . | |
| 5,655,335 | 8/1997 | Vermeer . | |
| 5,778,604 | * 7/1998 | Snow | 52/66 |
| 5,875,591 | 3/1999 | Jines . | |
| 6,000,191 | * 12/1999 | Kessler | 52/745.15 |

FOREIGN PATENT DOCUMENTS

| | | | |
|---|---|---|---|
| 177164 | * 8/1935 | (CH) | 52/66 |
| 2201173 | * 8/1972 | (DE) | 52/66 |
| 2309455 | * 9/1973 | (DE) | 52/66 |
| 2233440 | * 1/1974 | (DE) | 52/66 |

* cited by examiner

Primary Examiner—Carl D. Friedman
Assistant Examiner—L. Bennett Porterie, Jr.
(74) Attorney, Agent, or Firm—John M Harrison

(57) ABSTRACT

A retractable ceiling assembly for a poultry house, characterized by a ceiling which can be selectively raised from a flat to a pitched configuration in order to accommodate high-profile equipment or materials in the poultry house for cleaning, maintenance or storage purposes. In a preferred embodiment the retractable ceiling assembly is characterized by at least one ceiling unit including multiple rafter units which span the width of the poultry house in parallel, spaced-apart relationship with respect to each other. Each of the rafter units includes a pair of cross members pivotally attached to each other at substantially the middle of the rafter unit. A flexible ceiling typically constructed of overlapping sheets of fabric material is mounted on the bottom surfaces of the rafter units. A typically manually-operated winch, mounted on the interior of the poultry house roof at substantially the center of the ceiling unit, is connected to each rafter unit at the pivoting midpoint thereof by means of cables. Operation of the winch causes the initially horizontal cross members of the respective rafter units to pivot upwardly with respect to each other and bend the initially flat ceiling at the pivoting centers of the rafter units. The resulting pitched configuration of the ceiling accommodates high profile equipment or materials in the poultry house when the poultry house is being cleaned, maintained or used for storage purposes. Reverse operation of the winch causes the cross members of the rafter units to pivot downwardly by gravity, thereby lowering the ceiling to the original, flat position, as desired.

18 Claims, 6 Drawing Sheets

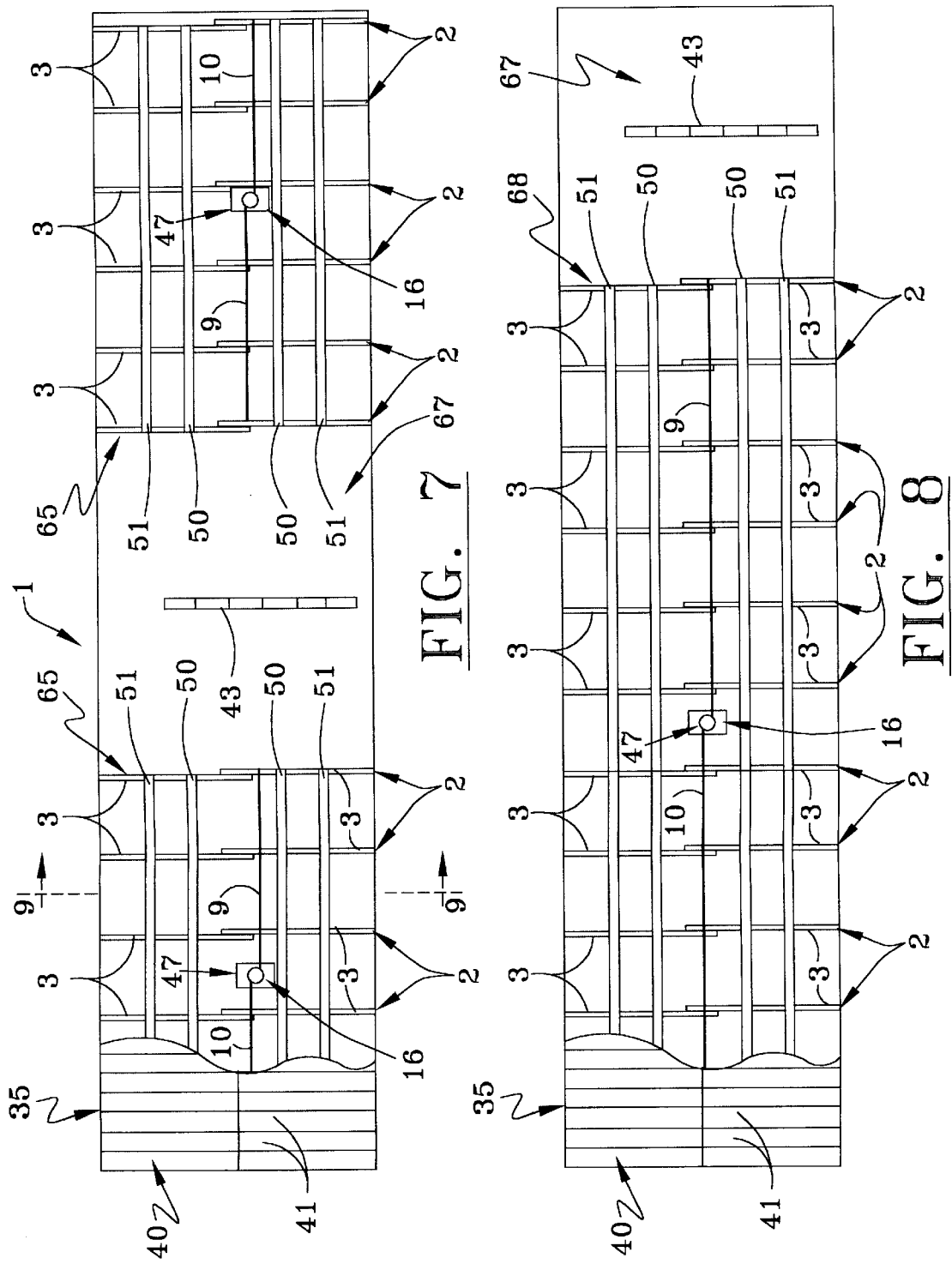

RETRACTABLE CEILING ASSEMBLY

BACKGROUND OF THE INVENTION

1. Field of the Invention

This invention relates to adjustable ceilings and more particularly, to a retractable ceiling assembly for a poultry house, characterized by a ceiling which can be selectively raised from a flat to a pitched configuration in the poultry house in order to accommodate high-profile equipment or materials therein for cleaning, maintenance or storage purposes. In a preferred embodiment the retractable ceiling assembly includes a pair of ceiling units separated by a ceiling gap in the center of the poultry house, which ceiling gap accommodates the conventional field system equipment used for importing poultry feed into the poultry house. Each ceiling unit is characterized by multiple, elongated rafter units which span the width of the poultry house in parallel, spaced-apart relationship with respect to each other, beneath the respective trusses of the pitched poultry house roof. Each of the rafter units includes a pair of cross members which are pivotally attached to each other at substantially the middle of the rafter unit. A flexible ceiling typically constructed of multiple elongated, overlapping sheets of durable fabric material is mounted on the bottom surfaces of the rafter units. A lift cable is looped around each rafter unit at the middle thereof and is trained around a corresponding pulley which is suspended from the roof of the poultry house, above the rafter unit. A typically manually-operated winch is supported on the interior of the poultry house roof at substantially the center of each ceiling unit, and first and second main cables are connected to a double cable spool of the winch and extend in opposite directions from the winch, above the rafter units. The lift cables attached to the rafter units on one side of the winch are connected to the first main cable, and the lift cables attached to the rafter units on the other side of the winch are connected to the second main cable. Operation of the winch simultaneously winds the first and second main cables on the double cable spool, which draws the lift cables on each side of the winch in concert on the respective pulleys, and the lift cables pivot the initially horizontal cross members of the respective rafter units upwardly with respect to each other. This action bends the ceiling at the pivoting centers of the rafter units and substantially conforms the initially flat ceiling to the pitched configuration of the rafter units. The resulting pitched configuration of the ceiling accommodates high profile equipment or materials in the poultry house when the poultry house is being cleaned, maintained or used for storage purposes. Reverse operation of the winch releases the first and second main cables and attached lift cables, thus causing the cross-members of the rafter units to pivot downwardly in concert with respect to each other by gravity to the horizontal position and lowering the ceiling to the original, flat position, as desired. During the lifting and lowering operations of the winch, the tension exerted on the first main cable by the combined weight of the rafter units on the corresponding side of the winch substantially counterbalances the tension exerted on the second main cable by the combined weight of the rafter units on that side of the winch, and this expedient decreases the weight load on the winch-supporting elements of the poultry house roof. In another embodiment the retractable ceiling assembly is characterized by a continuous ceiling unit, and a ceiling gap is provided between one end of the ceiling unit and the end of the poultry house for accommodating the field system equipment of the poultry house.

Poultry houses are typically constructed with a pitched roof, and insulation paneling is provided on the sloped ceiling inside the poultry house to trap heated air therein during cold weather, or cool air during hot weather. The pitched ceiling accommodates high-profile equipment such as forklifts in the poultry house, such as when cleaning of the poultry house is necessary. However, the pitched ceiling also contributes a substantial quantity of excess space which must be heated or cooled. Accordingly, a more efficient design includes providing a ceiling in the poultry house beneath the pitched roof in order to substantially close the lower portion of the poultry house interior from the upper portion of the poultry house interior which is defined by the pitched roof. This design, however, hinders movement of high profile equipment such as forklifts in the poultry house due to the low position of the ceiling. Accordingly, the retractable ceiling assembly of this invention provides a flat ceiling which substantially closes or seals the upper pitched area of the poultry house from the lower area of the poultry house in order to minimize the area of the poultry house interior which must be heated in cold weather or cooled in hot weather, and also provides a mechanism for raising the ceiling to accommodate high-profile equipment or materials in the poultry house, as needed.

2. Description of the Prior Art

Various types of adjustable ceilings and roofs for buildings are known in the art. A "Multilevel House Trailer" is disclosed in U.S. Pat. No. 3,612,589, dated Oct. 12, 1971, to Harry W. Locher, Jr. The multilevel house trailer is suitable for movement along public roads or highways, and the upper level of the house trailer can be selectively retracted into the lower level. U.S. Pat. No. 4,598,506, dated Jul. 8, 1986, to Arthur H. Nohb, et al., describes a "Swimming Pool Cover" which is designed to cover an indoor, in-ground pool. When in the lowered position, the cover is seated in the swimming pool opening and defines a support floor which is flush with the surrounding floor, and can be raised to become a false ceiling when use of the pool is desired. The cover is raised and lowered on vertical guides fitted with safety ratchets which prevent the cover from inadvertently lowering. A hoist mechanism for the cover is stored in a crawl space or attic above the normal ceiling, and operates by means of cables and pulleys attached to the cover. A "Solar House with Roof Board of Adjustable Inclination" is detailed in U.S. Pat. No. 4,928,444, dated May 29, 1990, to Mitsukazu Horie, et al. The solar house is characterized by a roof structure having pitched roof surfaces, one being downwardly inclined from a top ridge in a southernly direction, and the other being downwardly inclined from the ridge in a northernly direction. South and north side openings extend upwardly through the roof surfaces on opposite sides of the ridge. A shaft is rotatably mounted along the ridge and a roof board, mounted on the shaft, can be pivoted on the shaft between a first position wherein the roof board closes the south side opening and a second position wherein the roof board closes the north side opening. U.S. Pat. No. 5,655,335, dated Aug. 12, 1997, to Arthur Anthony Vermeer, details "Greenhouse Structures and Roof Structures Therefor" including at least two rectangular roof panels each having a lower edge hinged to the structure for movement between a closed, peaked configuration and an open, vertical configuration. Trusses extend transversely between the outer side walls, support members are carried by the trusses, and arch members are each connected at the ends thereof to respective support members for reinforcement of the peaked roof panels against wind. A ridge post member for each arch member extends vertically from its transverse center point and a ridge member is mounted on the ridge post members. The roof panels are pivotally mounted on the arch members, closely adjacent to the support members. A "Storage Building With Ram Openable Roof" is described in U.S. Pat. No. 5,778,604, dated Jul. 14, 1998, to Guy B. Snow. The storage building is characterized by a storage shed which is accessed through a front door or ramp when the roof portions are in an open, supported position. The wall and roof portions of the storage shed are constructed of metal frame members which are covered over with a plywood or vinyl siding. The roof covering can be corrugated galvanized sheeting or wood optionally covered by shingles or transparent or translucent plastic. The roof can be opened and closed by operation of a series of water-operated or electrically-operated rams. U.S. Pat. No. 5,875,591, dated Mar. 2, 1999, to Michael D. Jines, describes "Portable Panels for a Stage Shell". Adjacent backdrop panels and a suspended canopy form the stage shell, wherein the backdrop panels include angular alignment devices for readily and accurately aligning adjacent panels to present a pleasing, uniform appearance, as well as tilt aligning devices for readily aligning the angle of tilt of the backdrop panels. The suspended canopy, formed of individual canopy panels, includes rotatable hinge devices for storing the canopy panels in a substantially vertical position. A stay assembly is provided on the canopy panels for accurately fixing the relative angle of the canopy panels when they are deployed in a performance position above the backdrop panels.

An object of this invention is to provide a retractable ceiling assembly characterized by a ceiling which can be selectively raised and lowered in a building or other structure.

Another object of this invention is to provide a retractable ceiling assembly for a poultry house, characterized by a height-adjustable ceiling which can be selectively raised and lowered in the poultry house in order to accommodate high-profile equipment or materials therein for cleaning, maintenance or storage purposes.

Still another object of this invention is to provide a typically winch-operated, retractable ceiling assembly for poultry houses, which retractable ceiling assembly is characterized by at least one ceiling unit including a height-adjustable, flexible ceiling suspended from the pitched roof of the poultry house and a winch connected to the ceiling by means of cables, wherein operation of the winch causes the initially flat, substantially horizontal ceiling to assume a pitched configuration as the central portion of the ceiling is raised with respect to the stationary edges of the ceiling, and reverse operation of the winch causes the ceiling to resume the initial flat, substantially horizontal configuration.

Another object of this invention is to provide a retractable ceiling assembly for a poultry house, which retractable ceiling assembly includes a pair of ceiling units separated by a ceiling gap in the center of the poultry house and which ceiling gap accommodates the conventional field system equipment used for importing poultry feed into the poultry house.

Yet another object of this invention is to provide a retractable ceiling assembly for a poultry house, characterized by a continuous ceiling unit and wherein a ceiling gap is provided between one end of the ceiling unit and the end of the poultry house for accommodating the conventional field system equipment of the poultry house.

A still further object of this invention is to provide a retractable ceiling assembly for a poultry house, characterized by at least one ceiling unit including multiple, elongated rafter units which span the width of the poultry house, beneath the respective trusses of the pitched roof thereof in substantially parallel, spaced-apart relationship with respect to each other, each of which rafter units includes a pair of cross members pivotally attached to each other at substantially the middle of the rafter unit; a flexible ceiling typically constructed of multiple overlapping, elongated sheets of durable fabric material which ceiling is mounted on the bottom surfaces of the rafter units with the center portion of the ceiling underlying the pivoting midpoints of the rafter units; a lift cable looped around each rafter unit at the middle thereof and trained around a corresponding pulley which is suspended from the roof of the poultry house, above the rafter unit; a winch supported on the interior of the poultry house roof at substantially the longitudinal midpoint of the ceiling unit; and a first main cable which is connected to the winch and to the lift cables on one side of the winch and a second main cable which is connected to the winch and to the lift cables on the other side of the winch, wherein operation of the winch simultaneously winds the first and second main cables on the winch, the lift cables on the respective sides of the winch are drawn in concert on the respective pulleys and the lift cables pivot the cross members of the respective rafter units upwardly with respect to each other, such that the attached ceiling substantially conforms to the pitched configuration of the rafter units. The resulting pitched configuration of the ceiling accommodates high profile equipment or materials in the poultry house when the poultry house is being cleaned, maintained or used for storage purposes. Reverse operation of the winch releases the first and second main cables and the respective sets of attached lift cables, thus causing the cross members of the rafter units to pivot downwardly by gravity and lowering the ceiling to the original, flat position, as desired. During the lifting and lowering operations of the winch, the tension exerted on the first main cable by the combined weight of the rafter units on the corresponding side of the winch substantially counterbalances the tension exerted on the second main cable by the combined weight of the rafter units on the other side of the winch, and this decreases the weight load on the winch-supporting elements of the poultry house roof.

SUMMARY OF THE INVENTION

These and other objects of the invention are provided in a retractable ceiling assembly for a poultry house, characterized by a ceiling which can be selectively and reversibly raised from a flat to a pitched configuration in order to accommodate high-profile equipment or materials in the poultry house for cleaning, maintenance or storage purposes. In a preferred embodiment the retractable ceiling assembly is characterized by a pair of ceiling units separated by a ceiling gap at substantially the center of the poultry house, which ceiling gap accommodates the conventional field system equipment used for importing feed into the poultry house. Each ceiling unit includes multiple, elongated rafter units which span the width of the poultry house in substantially parallel, spaced-apart relationship with respect to each other, beneath respective trusses of the pitched poultry house roof. Each of the rafter units includes a pair of cross members pivotally attached to each other at substantially the middle of the rafter unit. A flexible ceiling typically characterized by multiple elongated, overlapping sheets of durable fabric material is mounted on the bottom surfaces of the rafter units, with the central portion of the ceiling underlying the pivoting midpoints of the rafter units. A lift cable is looped around each rafter unit at the middle thereof and is trained around a corresponding pulley which is suspended from the roof of the poultry house, above the rafter unit. A winch is mounted on the poultry house roof interior at substantially the center of each ceiling unit, and the lift cables of the respective rafter units on one side of the winch are attached to a first main cable which is connected to a double cable spool on the winch. The lift cables of the respective rafter units on the other side of the winch are attached to a second main cable which is likewise connected to the double cable spool of the winch. Operation of the winch simultaneously winds the first and second main cables on the double cable spool and the first and second main cables draw the respective sets of lift cables in concert on the respective pulleys. The lift cables pivot the cross members of the respective rafter units upwardly with respect to each other in concert. This action bends the ceiling along the rising cross members of the pivoting rafter units, such that the ceiling substantially conforms to the pitched configuration of the rafter units. The resulting pitched configuration of the ceiling accommodates high profile equipment such as forklifts in the poultry house when the poultry house is being cleaned, maintained or used for storage purposes. Reverse operation of the winch releases the main cable and lift cables, thus causing the cross members of the rafter units to pivot downwardly in concert with each other by gravity and lowering the ceiling to the original, flat position, as desired. During the lifting and lowering operations of the winch, the tension exerted on the first main cable by the combined weight of the rafter units on the corresponding side of the winch substantially counterbalances the tension exerted on the second main cable by the combined weight of the rafter units on that side of the winch, and this decreases the weight load on the winch-supporting elements of the poultry house roof. In another embodiment the retractable ceiling assembly is characterized by a continuous ceiling unit, and a ceiling gap is provided between one end of the ceiling unit and the end of the poultry house for accommodating the field system equipment of the poultry house.

BRIEF DESCRIPTION OF THE DRAWINGS

The invention will be better understood by reference to the accompanying drawings, wherein:

FIG. 7 is a top view of a poultry house, with the roof partially removed therefrom and conventional field system equipment shown mounted in the middle of the poultry house, more particularly illustrating a pair of ceiling units installed in spaced relationship with respect to each other on respective sides of the field system equipment in the poultry house, in a preferred embodiment of the retractable ceiling assembly;

FIG. 8 is a top view of a poultry house, with the roof partially removed therefrom and the conventional field system equipment shown mounted at one end of the poultry house, more particularly illustrating a continuous ceiling unit mounted in the poultry house in another embodiment of the retractable ceiling assembly, with the field system equipment between the ceiling unit and the end of the poultry house;

DESCRIPTION OF THE PREFERRED EMBODIMENTS

Figure 1:
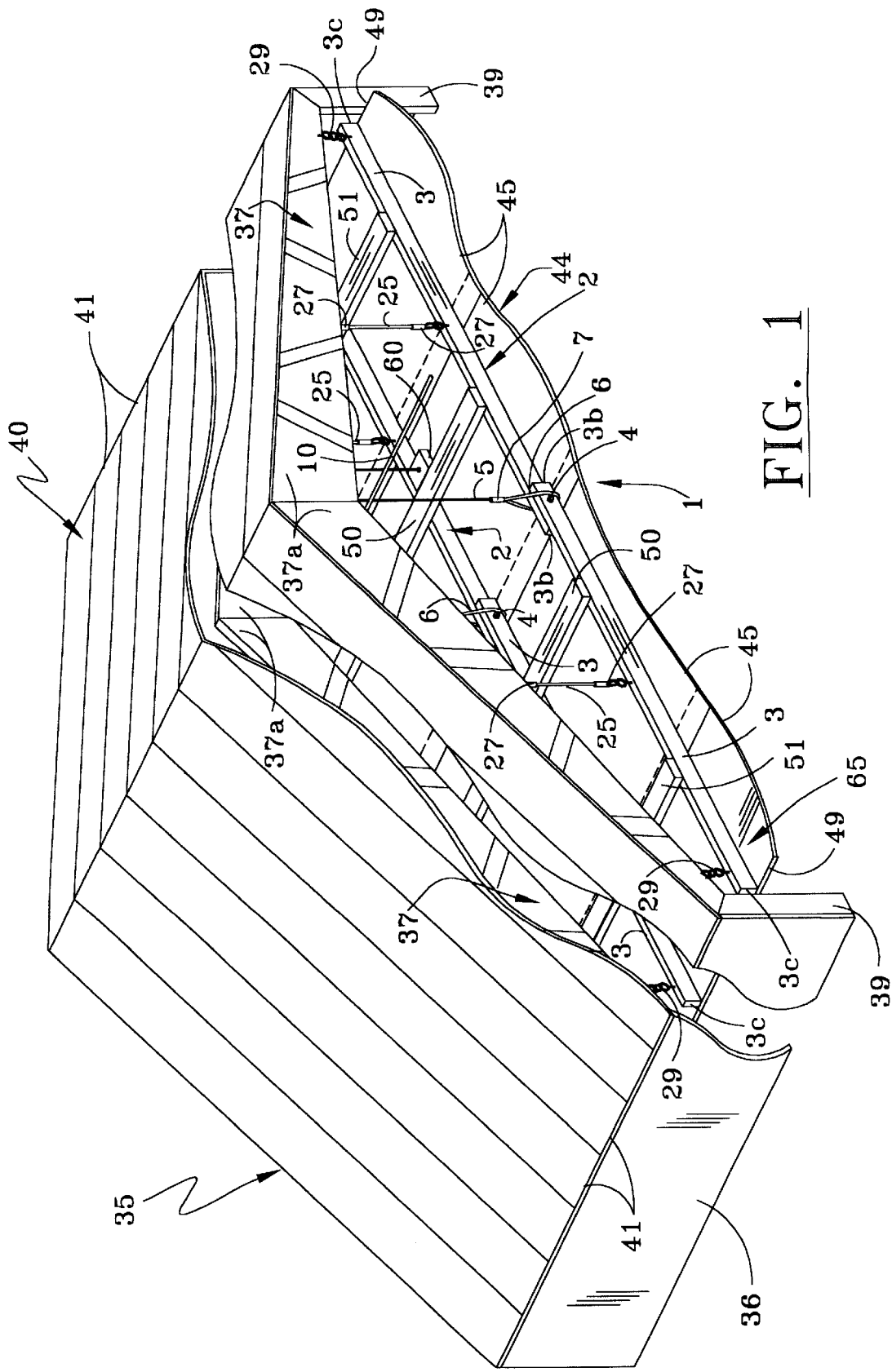
FIG. 1 is a perspective view, partially in section, of a preferred embodiment of the retractable ceiling assembly of this invention, mounted in a poultry house of conventional construction, with the ceiling positioned in the flat, lowered configuration.
Figure 2:
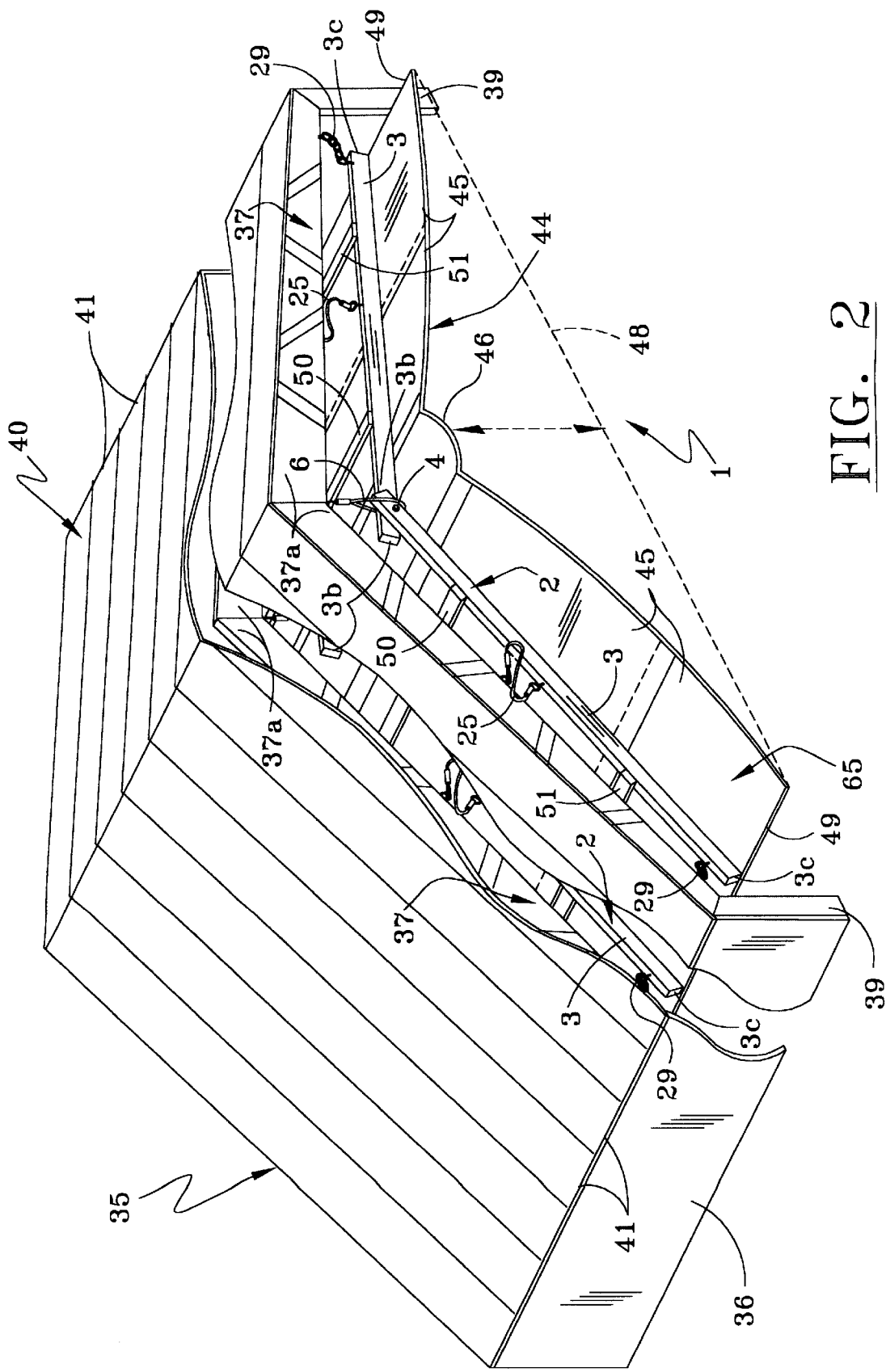
FIG. 2 is a perspective view, partially in section, of the retractable ceiling assembly illustrated in FIG. 1, with the ceiling positioned in the raised or pitched configuration.
Figure 4:
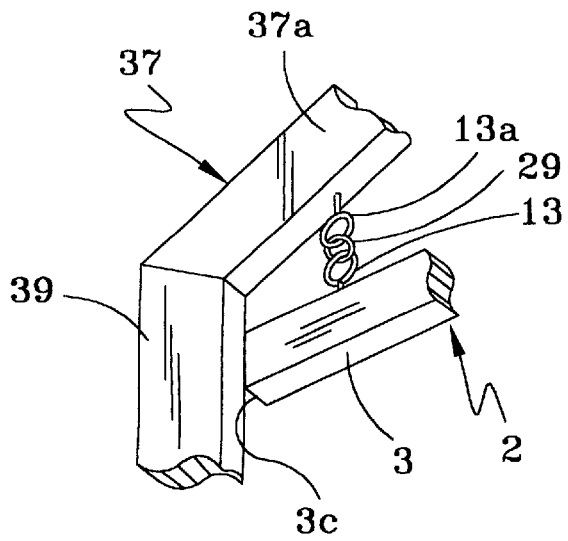
FIG. 4 is a perspective view, partially in section, of a cross member component of each rafter unit, more particularly illustrating a preferred, chain technique for suspending each cross member of each rafter unit from the roof of the poultry house.
Figure 5:
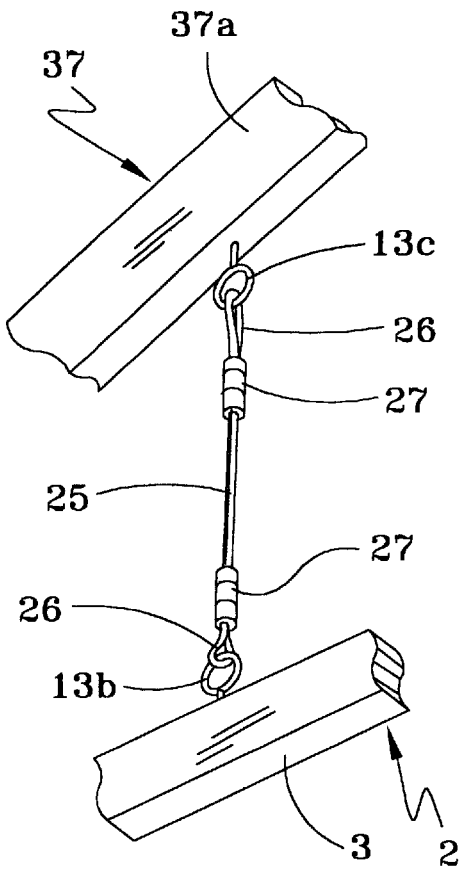
FIG. 5 is a perspective view, partially in section, of a cross member component of each rafter unit, more particularly illustrating a safety cable technique for additionally suspending each cross member of each rafter unit from the roof of the poultry house.
Figure 6:
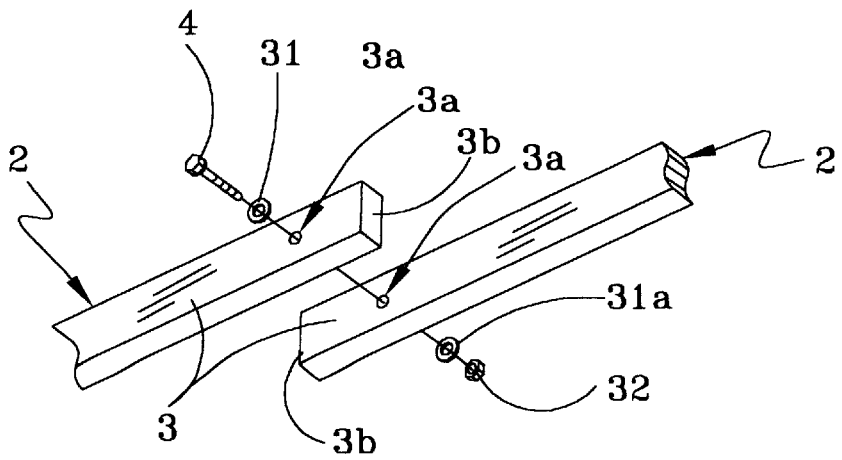
FIG. 6 is an exploded, perspective view, part in section, of a rafter unit component of the retractable ceiling assembly, more particularly illustrating a preferred, bolt technique for pivotally mounting the cross members of each rafter unit to each other in the rafter unit.

Referring initially to FIGS. 1, 2, 4–7, 9 and 10 of the drawings, in a preferred embodiment the retractable ceiling assembly of this invention is generally illustrated by reference numeral 1. The retractable ceiling assembly 1 is designed to be mounted in a poultry house 35 of conventional construction, which poultry house 35 typically includes wall panels 36, supported by a wall frame 39. The poultry house 35 further includes a pitched roof 40 characterized by multiple, spaced-apart scissor trusses 37, mounted on the wall frame 39 and multiple tin roof panels 41, mounted on the scissor trusses 37, as illustrated in FIGS. 1 and 2. As illustrated in FIG. 7, in a preferred embodiment the retractable ceiling assembly 1 is characterized by a pair of ceiling units 65, mounted in the poultry house 35 and separated by a ceiling gap 67. The ceiling gap 67 typically accommodates conventional field system equipment 43 in the center of the poultry house 35, which field system equipment 43 is operated for importing poultry feed into the poultry house 35 from a feed bin (not illustrated), located outside the poultry house 35. Each ceiling unit 65 includes multiple rafter units 2 which span the width of the poultry house 35 in spaced-apart, substantially parallel relationship with respect to each other beneath the respective scissor trusses 37 of the poultry house roof 40. Each rafter unit 2 is characterized by a pair of elongated cross members 3, each having a pivot end 3*b* and a wall end 3*c,* as illustrated in FIGS. 1 and 2, with the overlapping pivot end 3*b* portions of the cross members 3 of each rafter unit 2 pivotally attached to each other at substantially the center of the rafter unit 2, typically by means of a pivot bolt 4. Accordingly, as illustrated in FIG. 6, the pivot bolt 4 typically initially receives a first washer 31, and then is extended through registering bolt openings 3*a* provided in the respective overlapping cross members 3 and receives a second washer 31*a,* and a nut 32 is threaded on the pivot bolt 4 and tightened against the second washer 31*a*. The wall end 3*c* portion of each cross member 3 of each rafter unit 2 is resiliently suspended from the corresponding truss beam 37a of the scissor truss 37, typically by means of a retaining chain 29 of selected length. As illustrated in FIG. 4, the retaining chain 29 typically engages a first eye bolt 13, threaded in the upper surface of the cross member 3, and a second eye bolt 13a, threaded in the bottom surface of the corresponding truss beam 37a of the scissor truss 37. As illustrated in FIG. 5, a safety cable 25 typically further suspends each cross member 3 of each rafter unit 2 from the corresponding truss beam 37a of the scissor truss 37. Accordingly, a third eye hook 13b is threaded in the top surface of each cross member 3, and a fourth eye hook 13c is threaded in the bottom surface of the corresponding truss beam 37a. The safety cable 25 typically receives a pair of conventional microsleeve cable clamps 27, each of which is secured on the safety cable 25. The ends of the safety cable 25 are looped through the third eye bolt 13b and fourth eye bolt 13c, respectively, to form cable loops 26, and each end of the safety cable 25 is re-inserted in the corresponding microsleeve cable clamp 27 and secured therein by crimping the microsleeve cable clamp 27 against the inserted end segment of the safety cable 25. The length of the safety cables 25 is chosen such that the pair of safety cables 25 of each rafter unit 2 normally suspends the respective cross members 3 of the rafter unit 2 in a substantially horizontal, straight configuration with respect to each other, as illustrated in FIG. 1. As further illustrated in FIG. 7, an inside rafter brace 50 and an outside rafter brace 51 are secured on the upper surfaces of each cross member 3 of the parallel rafter units 2, in spaced-apart, substantially parallel relationship with respect to each other for stabilizing the rafter units 2 in the ceiling unit 65, as hereinafter further described.

Figure 9:
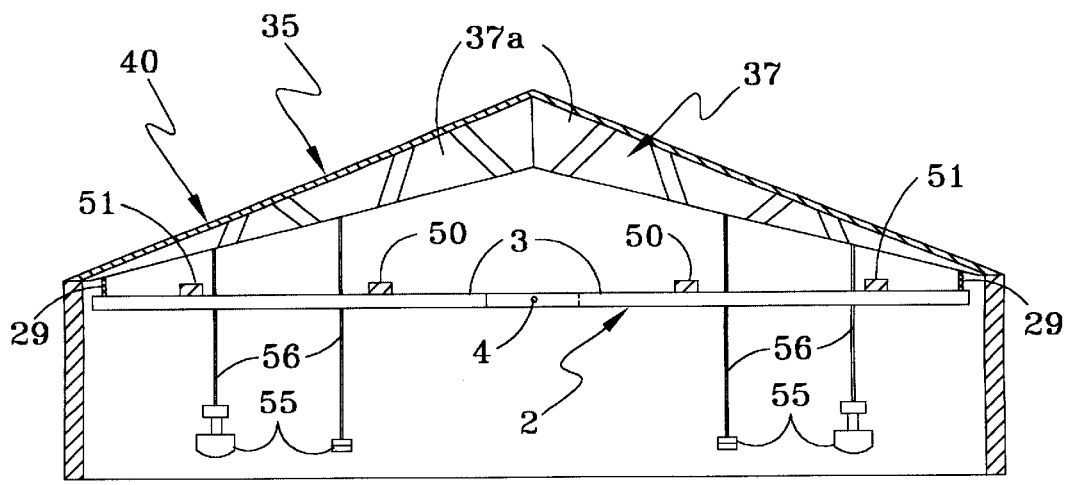
FIG. 9 is a sectional view, taken along section lines 9—9 of the poultry house illustrated in FIG. 7, with the drop cords for conventional poultry house watering and feed equipment shown suspended from the poultry house root, through the retractable ceiling assembly.
Figure 10:
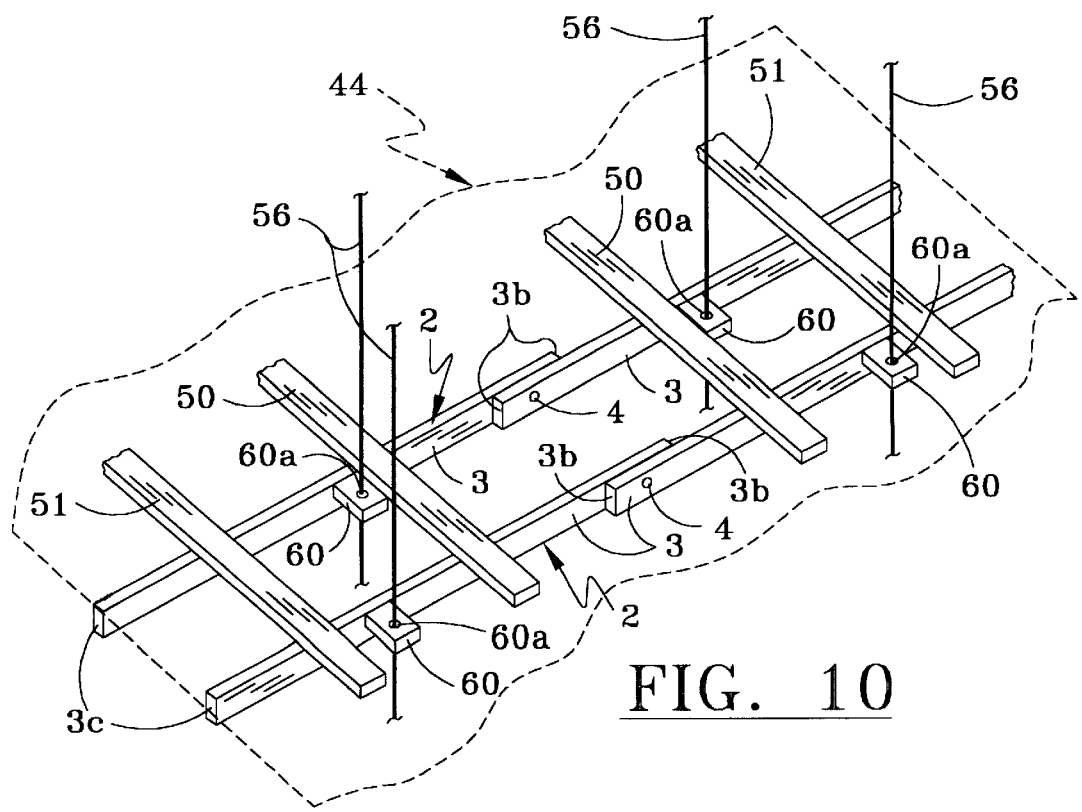
FIG. 10 is an enlarged, sectional view of a pair of adjacent rafter units of the retractable ceiling assembly, with the suspended drop cords shown extending through respective guide blocks mounted on the rafter units.

A flexible ceiling 44, typically constructed of any suitable resilient, durable, plastic or fabric material, is mounted on the bottom surfaces of the multiple rafter units 2, typically by means of nails, screws, staples or curtain tacks (not illustrated), in non-exclusive particular. As illustrated in FIGS. 1 and 2, the ceiling 44 is characterized by multiple, elongated ceiling sheets 45, each of which is secured to the rafter units 2 in overlapping relationship with respect to the adjacent ceiling sheet 45. The lateral ceiling edges 49 of the ceiling 44 are sealed against the inner wall surface (not illustrated) of the poultry house 35, by any suitable technique known to those skilled in the art. The front and rear edges (not illustrated) of the ceiling 44 are likewise typically sealed against a ceiling beam (not illustrated), mounted on the respective terminal scissor trusses 37 at the respective front and rear ends of the corresponding ceiling unit 65. Accordingly, the area of the poultry house 37 interior beneath the ceiling 44 is substantially sealed from the area of the poultry house 37 interior above the ceiling 44. As illustrated in FIG. 9, multiple drop cords 56, attached to the interior of the poultry house roof 40, collectively suspend conventional poultry house feeding and watering equipment 55 on the bottom ends thereof, at a selected adjustable height inside the poultry house 35. As illustrated in FIG. 10, a pair of drop cord guide blocks 60, each provided with a block opening 60a extending therethrough, is typically secured to each rafter unit 2, at selected locations on the cross members 3 of the respective rafter units 2. The drop cords 56 extend through the block openings 60a of the respective drop cord guide blocks 60, and through cord openings (not illustrated) provided in the underlying ceiling 44. Accordingly, by guiding the drop cords 56 through the ceiling 44, the drop cord guide blocks 60 prevent the drop cords 56 from tearing the ceiling 44 as the ceiling 44 is raised and lowered with the pivoting rafter units 2, as hereinafter described. Alternatively, the block openings 60a can be drilled at selected locations in the cross members 3 of the rafter units 2 and in the inside rafter brace 50 and outside rafter brace 51, respectively, depending on the desired location of the poultry house equipment 55 inside the poultry house 35, and the drop cords 56 extended through the block openings 60a to achieve the same purpose.

Figure 3:
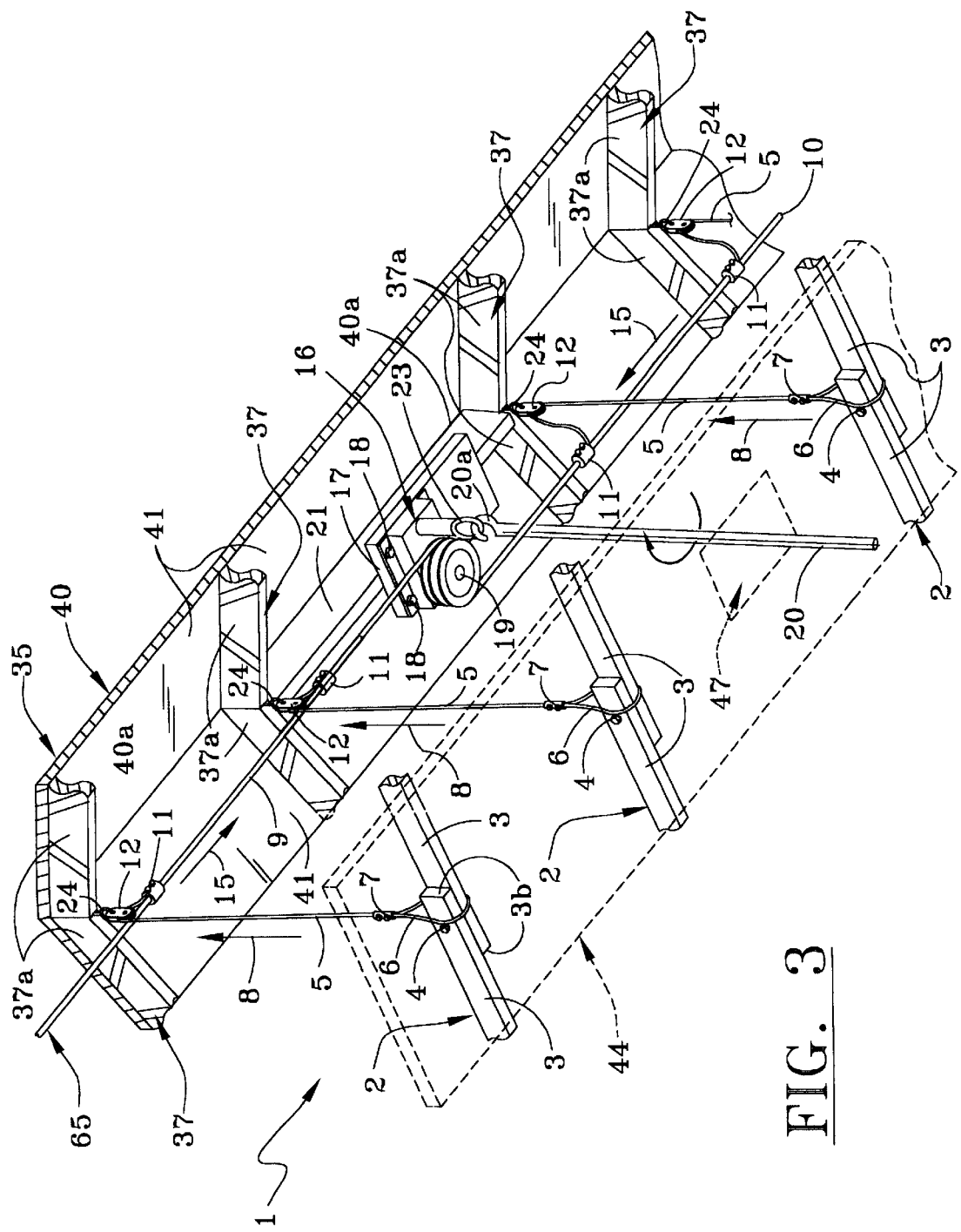
FIG. 3 is perspective view, partially in section, of the retractable ceiling assembly, more particularly illustrating concerted raising of the rafter units and attached ceiling by operation of a winch, connected to each rafter unit by means of cables.

Referring next to FIG. 3 and again to FIG. 7 of the drawings, a conventional, typically manually-operated winch 16 is mounted on the interior of the poultry house roof 40, at substantially the longitudinal center of each ceiling unit 65, as illustrated in FIG. 7. Accordingly, as illustrated in FIG. 3, a winch mount beam 21 is mounted beneath the roof 40, on one side of the pitched centerline 40a of the roof 40, and is typically bolted to the bottom surfaces of the truss beams 37a of respective adjacent scissor trusses 37. The winch 16, typically fitted with a pair of winch mount flanges 17, is mounted on the bottom surface of the winch mount beam 21, typically by means of winch mount bolts 18. The winch 16 includes a rotatable double cable spool 19, as well as a downwardly-extending winch hook 23 which removably receives a rod hook 20a, shaped in the upper end of a winch rod 20 which is fitted on the bottom end thereof with an eccentric winch handle (not illustrated). A rectangular winch rod opening 47 is provided in the ceiling 44 beneath the winch 16, through which winch rod opening 47 the winch rod 20 is extended for engagement of the winch hook 23 and operation of the winch 16. Clockwise or counter-clockwise rotation of the winch rod 20 on the rod hook 20a by operation of the winch handle (not illustrated) of the winch rod 20 causes corresponding rotation of the double cable spool 19 on the winch 16 in conventional fashion, for purposes which will be hereinafter described. A first main cable 9 is wound on the rotatable double cable spool 19 of the winch 16, and extends from the double cable spool 19, beneath the pitched scissor trusses 37 of the poultry house roof 40. A second main cable 10 is likewise wound on the double cable spool 19, beneath the first main cable 9, and extends in the opposite direction from the double cable spool 19, beneath the scissor trusses 37. Cable pulleys 12 are suspended from the poultry house roof 40, above the respective rafter units 2, typically by means of eye bolts 24 which are typically threaded in the respective scissor trusses 37. A lift cable 5 is trained around each cable pulley 12, and the upper end of each lift cable 5 is secured to the first main cable 9 or second main cable 10, typically by means of a conventional microsleeve cable clamp 11 or other suitable technique known to those skilled in the art. The bottom end of each lift cable 5 is looped around the pivoting middle portion of the corresponding rafter unit 2 to form a cable loop 6, and is typically secured in a microsleeve cable clamp 7. The first main cable 9 and second main cable 10 each terminates just beyond the connection point of the terminal lift cable 5 at the corresponding end of the ceiling unit 65 with the first main cable 9 and second main cable 10, respectively. Accordingly, clockwise rotation of the winch rod 20 causes winding of the first main cable 9 and second main cable 10, respectively, on the rotating double cable spool 19, as illustrated in FIG. 3. This action draws the lift cables 5 on the respective sides of the winch 16 upwardly through the respective cable pulleys 12, thus causing the cable loops 6 of the respective lift cables 5 to exert upward pressure on the pivoting cross members 3 of the respective rafter units 2. Because the wall end 3c portion of each cross member 3 is resiliently suspended from the corresponding truss beam 37a of the scissor truss 37, the lifting action of the lift cables 5 facilitates pivoting at the respective pivot bolts 4 of the cross members 3 upwardly with respect to the relatively stationary wall end 3c of each cross member 3. Consequently, the attached ceiling 44 is raised along the center thereof, and the bending ceiling 44 substantially conforms to the pitched configuration of the rafter units 2, as illustrated in FIG. 2 and hereinafter further described. Counterclockwise rotation of the winch rod 20 causes counterclockwise rotation of the double cable spool 19, thereby simultaneously unwinding the first main cable 9 and second main cable 10 from the double cable spool 19. The combined weight of the suspended rafter units 2 and attached ceiling 44 thus pulls the lift cables 5 downwardly through the respective cable pulleys 12, thereby lowering the ceiling 44 along the center thereof and causing the ceiling 44 to resume the flat, lowered configuration, limited by the retaining effect of the straightened safety cables 25 on the respective cross members 3, as illustrated in FIG. 1.

Referring again to FIGS. 1–3 and 10 of the drawings, in typical operation of the retractable ceiling assembly 1, the ceiling 44 of each ceiling unit 65 can be reversibly raised independently of the ceiling 44 of the other ceiling unit 65, from the flat configuration illustrated in FIG. 1 to the pitched configuration illustrated in FIG. 2, as desired, to facilitate moving high-profile equipment such as forklifts in the poultry house 35 for cleaning purposes, or storage of high-profile equipment or stacks of material in the poultry house 35. Accordingly, the winch rod 20 is initially extended upwardly through the winch rod opening 47 (FIG. 3) of the ceiling 44 of the corresponding ceiling unit 65, and the rod hook 20a of the winch rod 20 is inserted in the winch book 23 of the winch 16. Rotation of the winch rod 20 in the clockwise direction using the eccentric handle (not illustrated), as illustrated in FIG. 3, causes clockwise rotation of the double cable spool 19. Consequently, the first main cable 9 and second main cable 10 are simultaneously wound on the double cable spool 19, as indicated by the respective arrows 15 in FIG. 3, and this action of the first main cable 9 and second main cable 10 draws the respective sets of lift cables 5, attached to the first main cable 9 and second main cable 10, respectively, through the respective cable pulleys 12, in concert with each other, as heretofore described. The resulting lifting action of the lift cables 5 on the respective rafter units 2, indicated by the arrows 8 in FIG. 3, pivots the cross members 3 of the respective rafter units 2 upwardly with respect to each other. Because the ceiling 44 is attached to the respective cross members 3 of each rafter unit 2, the pivoting cross members 3 bend or angle the ceiling 44 at the pivot points of the cross members 3, as the center portion of the ceiling 44 is raised from the lowered ceiling line 48 (illustrated in phantom in FIG. 2) to the peaked configuration. Due to slackening of the flexible ceiling 44 between the pivoting cross members 3, a gravity-induced "bagging" or ceiling bulge 46 typically forms along the center portion of the rising ceiling 44, as further illustrated in FIG. 2. Accordingly, the ceiling 44 substantially conforms to the peaked configuration of the supporting rafter units 2, and the peaked ceiling 44 accommodates high-profile equipment or materials (not illustrated) in the poultry house 35 for cleaning, maintenance or storage purposes. When it is desired to lower the ceiling 44 to the flat configuration illustrated in FIG. 1, the winch rod 20 is rotated in the counterclockwise direction. Accordingly, the first main cable 9 and second main cable 10 are simultaneously slowly unwound from the rotating double cable spool 19, and the combined weight of the rafter units 2 and attached ceiling 44 pulls the gradually slackened lift cables 5 downwardly through the respective cable pulleys 12 until the ceiling 44 reaches the lowered, flat configuration at the lowered ceiling line 48 (FIG. 2), limited by the retaining effect of the straightened safety cables 25, as illustrated in FIG. 1 and heretofore described. The flat configuration of the ceiling 44 creates dead space between the ceiling 44 and the roof 40, and the insulating dead space air therein eliminates the need for heating or cooling the entire interior of the poultry house 35, since the ceiling 44 substantially confines the heated or cooled air to that region inside the poultry house 35 beneath the ceiling 44. As the ceiling 44 is raised and lowered with the pivoting rafter units 2, as heretofore described, the inside rafter braces 50 and outside rafter braces 51 stabilize the respective cross members 3 of the pivoting rafter units 2, and enhance concerted or simultaneous raising and lowering of all of the rafter units 2 of the corresponding ceiling unit 65. Moreover, the drop cord guide blocks 60 guide the respective drop cords 56 through the ceiling 44, in order to prevent the drop cords 56 from ripping or tearing the ceiling 44 where the drop cords 56 extend through the ceiling 44. It will be appreciated by those skilled in the art that during the lifting and lowering operations of the winch 16, the tension exerted on the first main cable 9 by the combined weight of the rafter units 2 on the corresponding side of the winch 16 substantially counterbalances the tension exerted on the second main cable 10 by the combined weight of the rafter units 2 on that side of the winch 16, and this expedient decreases the weight load on the winch mount beam 21 of the poultry house roof 40.

Referring next to FIG. 8 of the drawings, in some poultry houses 35 the conventional field system equipment 43 (which is operated to import poultry feed from outside the poultry house 35 into the poultry house 35) is mounted inside the poultry house 35, adjacent to one end thereof. Accordingly, in a second embodiment the retractable ceiling assembly 1 is characterized by a continuous ceiling unit 68 which extends from one end of the poultry house 35 and terminates adjacent to the field system equipment 43 in the poultry house 35, defining a ceiling gap 67 between the continuous ceiling unit 68 and the end of the poultry house 35. The continuous ceiling unit 68 has substantially the same design as the ceiling units 65 described above, but is uninterrupted by the ceiling gap 67 and is characterized by one winch 16 which is mounted on the poultry house roof 40 in the manner described above with respect to FIG. 3, at substantially the midpoint of the continuous ceiling unit 68. A first main cable 9 and a second main cable 10 are wound on the winch 16, and each extends from opposite sides of the winch 16 above the respective rafter units 2, with one set of lift cables 5 (FIG. 3) attached to the first main cable 9 on one side of the winch 16 and another set of lift cables 5 attached to the second main cable 10 on the opposite side of the winch 16. Operation of the winch 16 by means of the winch rod 20 raises and lowers the ceiling 44 with the respective rafter units 2 of the continuous ceiling unit 68, as heretofore described with respect to the ceiling units 65 illustrated in FIG. 7.

It will be appreciated by those skilled in the art that the retractable ceiling assembly of this invention provides a ceiling which can be installed in conventional existing or new construction poultry houses in order to facilitate efficient heating and cooling of the poultry house interior, as needed, as well as enhance air quality in the poultry house by facilitating efficient forced air exchange. Moreover, the height-adjustable feature of the ceiling facilitates movement of high-profile equipment or storage of stacked materials in the poultry house, as desired. While the preferred embodiment of the retractable ceiling assembly described above utilizes a manually-operated winch for raising and lowering the ceiling of the assembly, it is understood that an electrical winch or any other mechanism capable of controlled raising and lowering of the ceiling in the poultry house can be used for the purpose.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A retractable ceiling assembly for a structure, comprising at least one ceiling unit for installation in the structure, said at least one ceiling unit comprising at least one pair of cross-members pivotally connected to each other at a pivot point for vertical adjustment in the structure; a ceiling carried by said cross members; and a winch mechanism operably connected to said cross members of said at least one ceiling unit, respectively, for selectively raising and lowering said cross members and said ceiling in the structure.

2. The retractable ceiling assembly of claim 1 wherein said at least one ceiling unit comprises a pair of ceiling units for installation in the structure in spaced-apart relationship with respect to each other.

3. The retractable ceiling assembly of claim 1 comprising a retaining chain connected to said cross members, respectfully, for attaching said cross members to the structure.

4. The retractable ceiling assembly of claim 3 wherein said at least one ceiling unit comprises a pair of ceiling units for installation in the structure in spaced-apart relationship with respect to each other.

5. The retractable ceiling assembly of claim 1 comprising a retaining chain connected to said cross members, respectively, at each end of said, cross members respectively, for attaching said cross members to the structure.

6. The retractable ceiling assembly of claim 5 wherein said at least one ceiling unit comprises a pair of ceiling units for installation in the structure in spaced-apart relationship with respect to each other.

7. A retractable ceiling assembly for a poultry house, comprising at least one ceiling unit for installation in the poultry house, said at least one ceiling unit each comprising a first set of adjacent rafter units and a second set of adjacent rafter units provided in adjacent relationship with respect to said first set of rafter units for vertical adjustment in the poultry house; a ceiling carried by said first set of rafter units and said second set of rafter units; a first set of lift cables engaging said first set of rafter units and a second set of lift cables engaging said second set of rafter units; a first main cable engaging said first set of lift cables and a second main cable engaging said second set of lift cables; and a winch operably engaging said first main cable and said second main cable at substantially the middle of said at least one rafter unit, respectively, for selectively raising and lowering said ceiling in the poultry house, whereby tension exerted on said first main cable substantially counterbalances tension exerted on said second main cable as said ceiling is raised and lowered by operation of said winch.

8. The retractable ceiling assembly of claim 7 wherein said at least one ceiling unit comprises a pair of ceiling units for installation in the poultry house in spaced-apart relationship with respect to each other.

9. The retractable ceiling assembly of claim 7 comprising a retaining chain connected to said first set of rafter units, respectively, and said second set of rafter units, respectively, at each end of said first set of rafter units, respectively, and said second set of rafter units, respectively, for attaching said first set of rafter units and said second set of rafter units to the poultry house.

10. The retractable ceiling assembly of claim 9 wherein said at least one ceiling unit comprises a pair of ceiling units for installation in the poultry house in spaced-apart relationship with respect to each other.

11. The retractable ceiling assembly of claim 7 wherein said first set of rafter units, respectively, and said second set of rafter units, respectively, comprises a pair of cross members pivotally connected to each other at a pivot point and said first set of lift cables and said second set of lift cables are attached to said first set of rafter units and said second set of rafter units, respectively, at said pivot point, whereby said cross members of said first set of rafter units and said second set of rafter units, respectively, pivot with respect to each other at said pivot point for vertical adjustment of said ceiling in the poultry house, responsive to operation of said winch.

12. The retractable ceiling assembly of claim 11 wherein said at least one ceiling unit comprises a pair of ceiling units for installation in the poultry house in spaced-apart relationship with respect to each other.

13. The retractable ceiling assembly of claim 11 comprising a retaining chain connected to said first set of rafter units, respectively, and said second set of rafter units, respectively, at each end of said first set of rafter units, respectively, and said second set of rafter units, respectively, for attaching said first set of rafter units and said second set of rafter units to the poultry house.

14. The retractable ceiling assembly of claim 13 wherein said at least one ceiling unit comprises a pair of ceiling units for installation in the poultry house in spaced-apart relationship with respect to each other.

15. A retractable ceiling assembly for a poultry house having a roof, said retractable ceiling assembly comprising at least one ceiling unit for installation in the poultry house, said at least one ceiling unit comprising a first set of substantially parallel, spaced-apart rafter units and a second set of substantially parallel, spaced-apart rafter units provided in adjacent relationship to said first set of rafter units for vertical adjustable movement in the poultry house beneath the roof; a ceiling carried by said first set of rafter units and said second set of rafter units; a first set of cable pulleys suspended from the roof of the poultry house substantially above said first set of rafter units and a second set of cable pulleys suspended from the roof of the poultry house substantially above said second set of rafter units; a first set of lift cables engaging said first set of rafter units, respectively, with said first set of lift cables trained around said first set of cable pulleys, respectively, and a second set of lift cables engaging said second set of rafter units, respectively, with said second set of lift cables trained around said second set of cable pulleys, respectively; a first main cable attached to said first set of lift cables and a second main cable attached to said second set of lift cables; and a winch operably engaging said first main cable and said second main cable at substantially the center of said at least one ceiling unit, respectively, for selectively raising and lowering said first set of rafter units, said second set of rafter units and said ceiling in the poultry house, whereby tension exerted on said first main cable substantially counterbalances tension exerted on said second main cable as said ceiling is raised and lowered by operation of said winch.

16. The retractable ceiling assembly of claim 15 wherein said first set of rafter units, respectively, and said second set of rafter units, respectively, comprises a pair of cross members pivotally connected to each other at a pivot point and said first set of lift cables and said second set of lift cables are attached to said first set of rafter units and said second set of rafter units, respectively, at said pivot point, whereby said cross members of said first set of rafter units and said second set of rafter units, respectively, pivot with respect to each other at said pivot point for vertical adjustment of said ceiling in the poultry house, responsive to operation of said winch.

17. The retractable ceiling assembly of claim 16 wherein said at least one ceiling unit comprises a pair of ceiling units for installation in the poultry house in spaced-apart relationship with respect to each other.

18. The retractable ceiling assembly of claim 16 wherein said at least one ceiling unit comprises a continuous ceiling unit for installation in the poultry house.

* * * * *